US008510755B2

(12) United States Patent
Paramasivam et al.

(10) Patent No.: US 8,510,755 B2
(45) Date of Patent: Aug. 13, 2013

(54) AUTOMATICALLY RE-STARTING SERVICES

(75) Inventors: Kartik Paramasivam, Redmond, WA (US); Jayteerth N. Katti, Redmond, WA (US); Vinod Shanbhag, Redmond, WA (US); Ramasubramaniam Poornalingam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 843 days.

(21) Appl. No.: 12/489,095

(22) Filed: Jun. 22, 2009

(65) Prior Publication Data

US 2010/0325642 A1 Dec. 23, 2010

(51) Int. Cl.
*G06F 9/54* (2006.01)

(52) U.S. Cl.
USPC ............................ 719/317; 714/13; 714/15

(58) Field of Classification Search
None
See application file for complete search history.

(56) References Cited

U.S. PATENT DOCUMENTS

| | | | |
|---|---|---|---|
| 7,069,551 B2 | 6/2006 | Fong et al. | |
| 7,130,891 B2 | 10/2006 | Bernardin et al. | |
| 7,310,684 B2 | 12/2007 | Patrick et al. | |
| 2003/0004774 A1 | 1/2003 | Greene et al. | |
| 2004/0250283 A1* | 12/2004 | Duigenan et al. | 725/60 |
| 2005/0015643 A1* | 1/2005 | Davis et al. | 714/4 |
| 2007/0156870 A1* | 7/2007 | McCollum | 709/223 |

OTHER PUBLICATIONS

Leonid Ganeline, WCF: Availability of the WCF services, May 7, 2008, pp. 1-4.*
Paul Brown, Intalio PXE, Jan. 24, 2005, pp. 1-5.*
Open Grid Services Development Framework User's Guide, "Java Programmer's Guide Core Framework", Sep. 3, 2003, 11 pages.
Gadgil, Harshawardhan, "Scalable, Fault-tolerant Management of Grid Services: Application to Messaging Middleware", Based on information and belief available, at least as early as Mar. 31, 2009, 47 pages.
Wu, Wenjun, et al., "Service Oriented Architecture for VoIP conferencing", Based on information and belief available, at least as early as Mar. 31, 2009, 11 pages.
Reich, Christoph, et al., "Engineering an Autonomic Container for WSRF-based Web Services", 15th International Conference on Advanced Computing and Communications, 2007 IEEE, pp. 277-282.
Wasson, Glenn, et al., "OGSI.NET:An OGSI-complaint Hosting Container for the .NET Framework", Nov. 12, 2003, 9 pages.
Oasis, "Reference Architecture for Service Oriented Architecture Version 0.3", Mar. 4, 2008, 102 pages.

* cited by examiner

*Primary Examiner* — H S Sough
*Assistant Examiner* — Syed Roni
(74) *Attorney, Agent, or Firm* — Workman Nydegger (57) ABSTRACT

The present invention extends to methods, systems, and computer program products for automatically re-starting services. Embodiments of the invention can be used to re-start a service when it is determined that the service stopped during the processing pending work. A container manager durably tracks a service's status (busy/idle and alive/dead) and tracks transitions between statuses. Accordingly, when a busy service is deemed dead (due to any event), the container manager can automatically re-start the service. Upon re-start the service can check for pending work and start executing its pending work.

18 Claims, 3 Drawing Sheets

AUTOMATICALLY RE-STARTING SERVICES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, a variety of different services are hosted on a few computer systems or even a single computer system. Depending on the "density" of the applications and their frequency of use, running all of the applications simultaneously is at least an inefficient use of resources (e.g., system memory) and can potentially degrade system performance. Accordingly, to utilize system resources more efficiently, various strategies have been developed.

One strategy uses message activated containers. When the container receives a message, the container loads the service, including the process, application domain, and the service object, into system memory. Then, when the service is idle for a configurable period of time, the container removes the service, including the process, application domain, and the service object, from system memory.

Use of message activated containers is advantageous for a variety of reasons, including the ability to perform work asynchronously even in the absence of an active message/request. However, for long-lived services, there is always some chance that the application domain or process goes away, for example, due to a computer system malfunction or reboot, before completion. If the application domain and/or process go away before completion, there may be no way to reliably recover. As such, messages may need to be resent to the service.

BRIEF SUMMARY

The present invention extends to methods, systems, and computer program products for automatically re-starting services. A health reporting agent sends a request to register a service for re-starts to a container manager. The service runs in a message activated container. The health reporting agent reports health events for the service. The container manager is configured to listen for and store service health events for services. The registration request indicates that the service is active and busy. The container manager receives the request to register the service for re-starts from the health reporting agent.

The container manager registers the service for re-starts by indicating in durable storage that the service is active and busy in response to receiving the registration request. The container manager acknowledges the registration for re-starts to the health reporting agent subsequent to indicating in durable storage that the service is active and busy. The health reporting agent receives the registration acknowledgement from the container manager.

Subsequently, the health reporting agent detects that the service is active and busy. The health reporting agent sends a heartbeat message to the container manager in response to detecting that the service is active and busy. The heartbeat message indicates a health status of busy, indicative of the service performing work. The container manager receives the heartbeat message from a health reporting agent. The container manager indicates in durable storage that the service is busy in response to receiving the heartbeat message. The container manager acknowledges receipt of the heartbeat message to the health reporting agent subsequent to indicating in durable storage that the service is busy. The health reporting agent receives the acknowledgement from the container manager.

Subsequently, the message activated container operates in a manner that prevents the health reporting agent from sending a pre-configured number of further heartbeat messages to the container manager. The container manager detects that it has missed the pre-configured number of further heartbeat messages from the health reporting agent subsequent to receiving the heartbeat message. The container manager determines that the message activated container is no longer operating as intended in response to detecting that the container manager has missed a pre-configured number of further heartbeat messages from the health reporting agent.

The container manager re-starts the service in response to the determination. The container manager indicates in durable storage that the service is to be re-started. The container manager issues a re-start command to a service control endpoint configured to re-start the service. The service control endpoint receives the re-start command from the container manager. The container manager and the service control endpoint interoperate to re-start the service in response to receiving the re-start command. Upon re-start, the service triggers an OnStart event handler that checks for pending work for the service.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for automatically re-starting services. A health reporting agent sends a request to register a service for re-starts to a container manager. The service runs in a message activated container. The health reporting agent reports health events for the service. The container manager is configured to listen for and store service health events for services. The registration request indicates that the service is active and busy. The container manager receives the request to register the service for re-starts from the health reporting agent.

The container manager registers the service for re-starts by indicating in durable storage that the service is active and busy in response to receiving the registration request. The container manager acknowledges the registration for re-starts to the health reporting agent subsequent to indicating in durable storage that the service is active and busy. The health reporting agent receives the registration acknowledgement from the container manager.

Subsequently, the health reporting agent detects that the service is active and busy. The health reporting agent sends a heartbeat message to the container manager in response to detecting that the service is active and busy. The heartbeat message indicates a health status of busy, indicative of the service performing work. The container manager receives the heartbeat message from a health reporting agent. The container manager indicates in durable storage that the service is busy in response to receiving the heartbeat message. The container manager acknowledges receipt of the heartbeat message to the health reporting agent subsequent to indicating in durable storage that the service is busy. The health reporting agent receives the acknowledgement from the container manager.

Subsequently, the message activated container operates in a manner that prevents the health reporting agent from sending a pre-configured number of further heartbeat messages to the container manager. The container manager detects that it has missed the pre-configured number of further heartbeat messages from the health reporting agent subsequent to receiving the heartbeat message. The container manager determines that the message activated container is no longer operating as intended in response to detecting that the container manager has missed a pre-configured number of further heartbeat messages from the health reporting agent.

The container manager re-starts the service in response to the determination. The container manager indicates in durable storage that the service is to be re-started. The container manager issues a re-start command to a service control endpoint configured to re-start the service. The service control endpoint receives the re-start command from the container manager. The container manager and the service control endpoint interoperate to re-start the service in response to receiving the re-start command. Upon re-start, the service triggers an OnStart event handler that checks for pending work for the service. Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
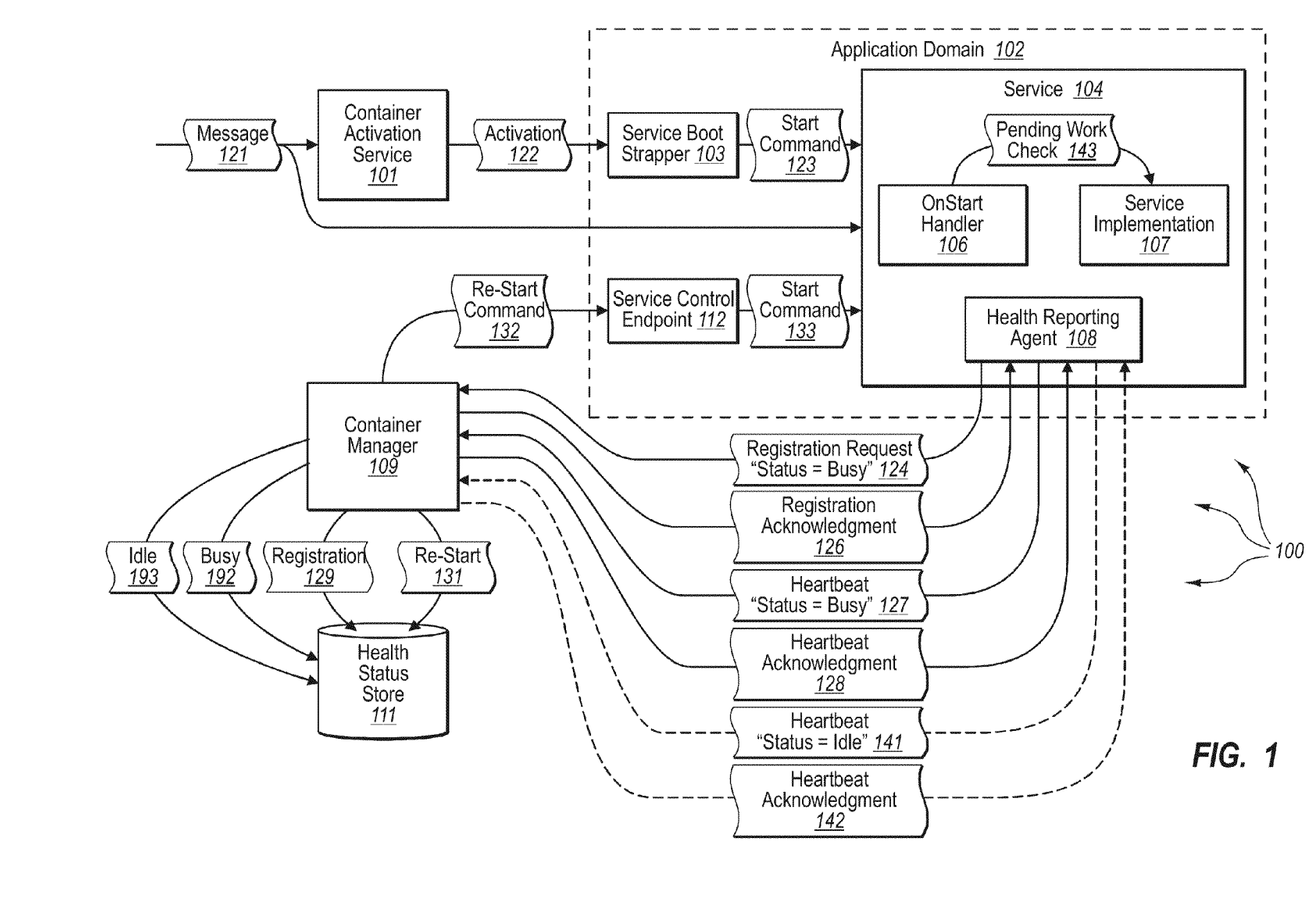
FIG. 1 illustrates an example computer architecture that facilitates automatically re-starting services.

FIG. 1 illustrates an example computer architecture 100 that facilitates automatically re-starting services. Referring to FIG. 1, computer architecture 100 includes container activation service 101, application domain 102, service boot strapper 103, service 104, service control endpoint 112, container manager 109, and health status store 111. Each of the depicted computer systems is connected to one another over (or is part of) a network, such as, for example, a Local Area Network ("LAN"), a Wide Area Network ("WAN"), and even the Internet. Accordingly, each of the depicted computer systems and their components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In some embodiments, application domain 102 is a message activated container. As such, application domain 102 and service 104 are brought into memory upon receipt of a message for service 104. After a specified idle period of time (i.e., when service 104 has not messages process), application domain 102 and server are removed from memory. Container activation service 101 can be configured to receive messages for services that are not in memory. When a message for a service is received, container activation service can cause an application domain and the service to be brought into memory.

For example, container activation service 101 can receive message 121. Container activation service 101 can determine that message 121 is for service 104. In response, container service 101 can issue activation 122 to create application domain 102 and bring application 102 into memory. As depicted, application domain 102 includes service bootstrapper 103 and service control endpoint 112. Service bootstrapper 103 can receive activation 122. In response to receiving activation 122, service bootstrapper 103 can issue start command 123 to start service 104 (within application domain 102) and bring service 104 into memory.

Generally, service control endpoint 112 is configured to receive re-start commands for services (e.g., from container manager 109) and re-start services in response to corresponding re-start commands.

Upon service 104 being brought into memory, message 121 can then be delivered to service 104 for processing. In some embodiments, service 104 is a Windows Foundation/Windows Communication Foundation ("WF/WCF") service. As depicted, service 104 includes OnStart handler 106, service implementation 107, and health reporting agent 108. OnStart handler 106 is configured to check service implementation 107 for pending work in response to service 104 starting up. For example, any time service 104 starts (whether or not it is a re-start), service 104 can trigger OnStart handler 106 to check for pending work for service 104. Health reporting agent 108 is configured to register service 104 for restarts. Health reporting agent 108 is also configured to send status messages to container manager 109 at a specified frequency.

A status message can indicate the status of service 104, such as, for example, busy, idle, etc. When service 104 is processing messages health reporting agent 108 indicates a status of "busy" in status messages for service 104. On the other hand, when service 104 is idle, health reporting agent 108 indicates a status of "idle" in status messages for service 104. Other statuses as well as refinements of busy and idle statues with increased detail and/or granularity are also possible.

The specified frequency for sending status ("heartbeat") messages has a recurring time period (or heartbeat) when status messages are sent. On each occurrence of the recurring time period, service 104 sends a status message to container manager 109. In some embodiments, the recurring time period or heartbeat is somewhere in the range of 5 ms-50 ms. For example, it may be that health reporting agent 108 sends a heartbeat message to container manager 109 every 10 ms. However, other recurring time periods outside the 5 ms-50 ms range are also possible.

Generally, container manager 109 is configured to automatically re-start a service. A service can be re-started when it is determined that something is preventing the service from continuing to perform work even though work for the service is likely pending. Container manager 109 can receive registration requests from health reporting agents for registering services for automatic re-starts. Container manager 109 can also make determinations from received status messages and/or a failure to receive status messages when a service is to be re-started. For example, if container manager 109 fails to receive status messages for a specified number of heartbeats after receiving a message indicating a service busy status, container manager 109 can assume that the service is to be re-started.

Container manager 109 can also attempt to distinguish between when a service has gone away due to idleness and when a service has gone away with pending work. For example, container manager 109 can identify a transition from heartbeat messages indicating a busy status to heartbeat messages indicating an idle status for a specified service. Subsequent to the transition, container manager 109 may cease receiving further heartbeat messages for the specified service. Container manager 109 can reason that the specified service went away due to inactivity, since an idle status was received prior to heartbeat messages for the service stopping.

On the other hand, container manager 109 can receive one or more heartbeat messages indicating a busy status for a specified service. Subsequent to the one or more heartbeat messages, container manager 109 may not receive any further heartbeat messages for a pre-configured number of heartbeats. Container manager 109 can reason that the specified service went away due to a problem with the service, application domain, machine, etc., since a busy status was received prior to heartbeat messages for the service stopping.

Generally, health status store 111 is configured to store health status information for services. Health status store 111 can be durable storage. When a service is registered for automatic re-starts container manager 109 records the registration in health status store 111. As heartbeat messages are received, container manager 109 also stores contained service statuses in health status store 111. Thus, if container manager 109 fails for some reason, container manager 109 can refer to health status store 111 to access service statuses.

Thus, upon a re-start of container manager 109 (e.g., machine recycle), container manger 109 can refer to health status store 111. Through reference to health status store 111, container manager 109 can understand which services where busy (e.g., had pending work) when container manager 109 was re-started (recycled). When container manager 109 detects services with pending work, container manager 109 attempts to re-start the service.

Figure 2A:
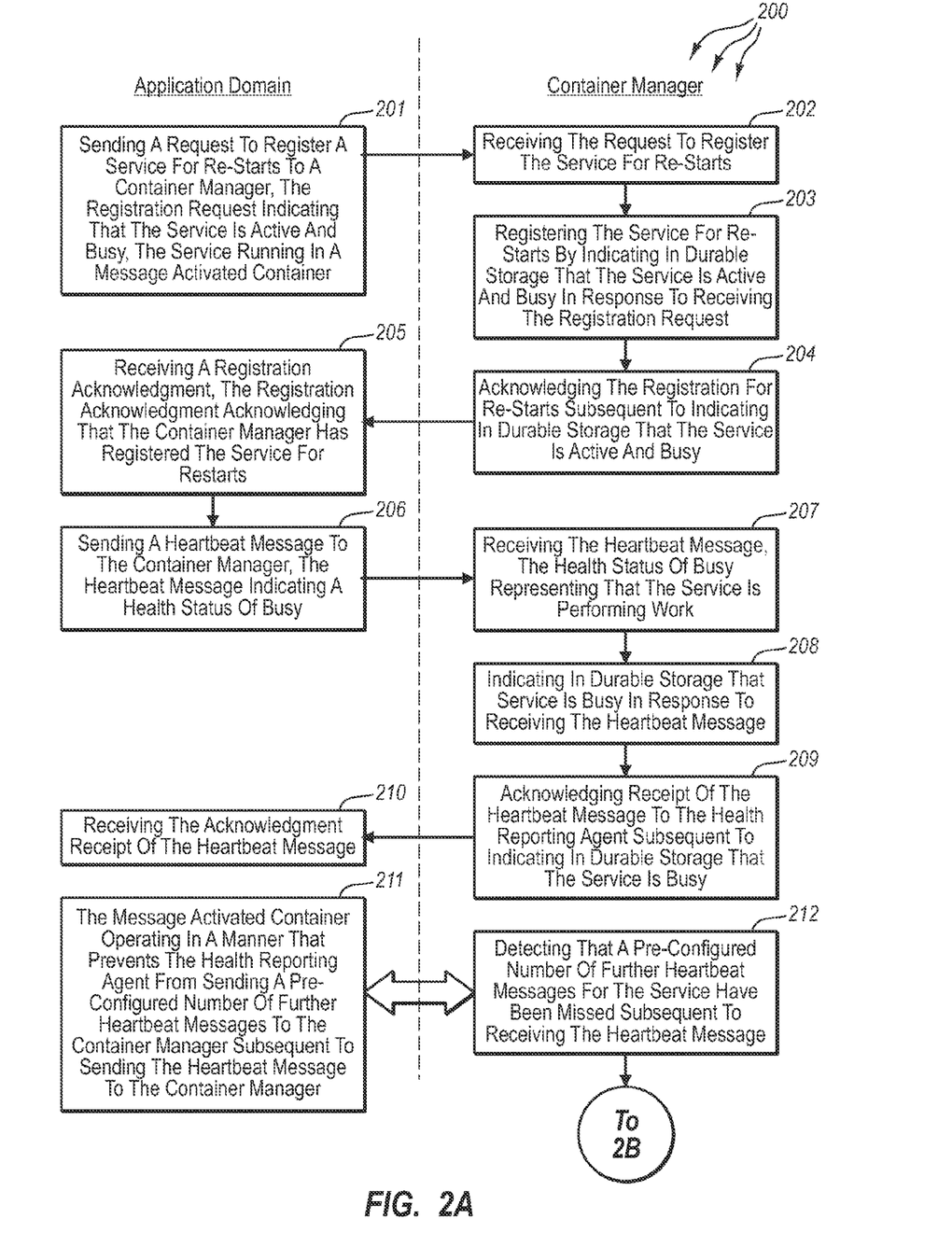
FIG. 2 illustrates a flow chart of an example method for automatically re-starting a service.
Figure 2B:
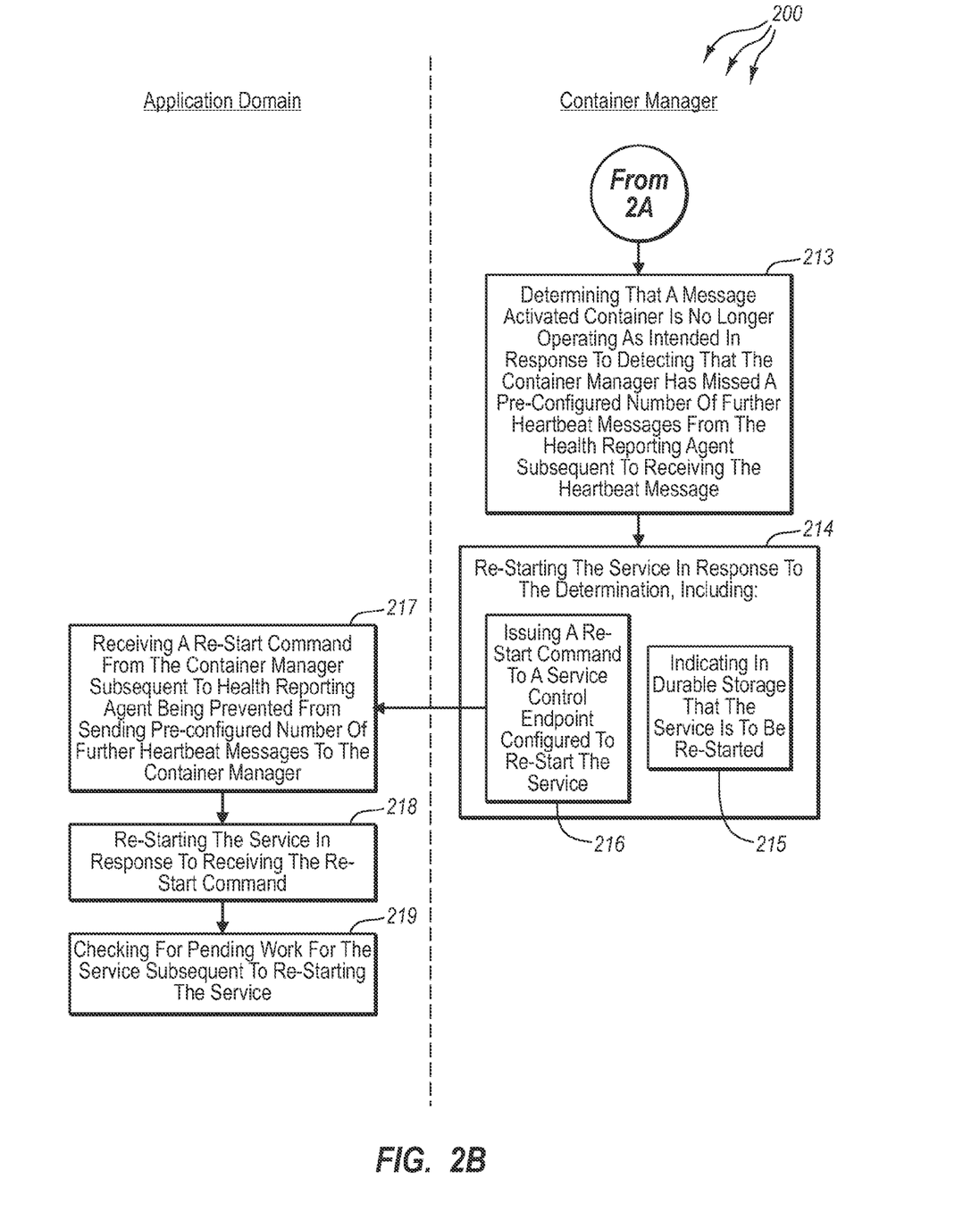

FIG. 2 illustrates a flow chart of an example method 200 for automatically re-starting a service. Method 200 will be described with respect to the components and data of computer architecture 100.

Method 200 includes an act of sending a request to register a service for re-starts to a container manager, the registration request indicating that the service is active and busy, the service running in a message activated container (act 201). For example, health reporting agent 108 can send registration request 124 to container manger 109 to register service 104 for re-starts. Registration request 124 includes "status=busy", indicating that service 104 is active and busy (e.g., processing message 121). As depicted in computer architecture 100, service 104 is running in application domain 102 (a message activated container)

Method 200 includes an act of receiving the request to register the service for re-starts (act 202). For example, container manager 109 can receive registration request 124 from health reporting agent 108. Method 200 includes an act of registering the service for re-starts by indicating in durable storage that the service is active and busy in response to receiving the registration request (act 203). For example, container manager 109 can register service 104 for restarts by storing registration 129 in health status store 111. Registration 129 can indicate that service 104 was active and busy at the time container manager 109 received registration request 124.

Method 200 includes an act of acknowledging the registration for re-starts subsequent to indicating in durable storage that the service is active and busy (act 204). For example, container manager 109 can send registration acknowledgement 126 to health reporting agent 108 subsequent to storing registration 129 at health status store 111. Method 200 includes an act of receiving a registration acknowledgement, the registration acknowledgement acknowledging that the container manager has registered the service for restarts (act 205). For example, health reporting agent 108 can receive registration acknowledgement 126 from container manager 109. Registration acknowledgement 126 acknowledges to health reporting agent 108 that container manager 109 has registered service 104 for restarts.

In some embodiments, the registration for re-starts is performing synchronously. That is, health reporting agent 108 waits for registration acknowledgement 126 before performing any work and/or sending any heartbeat messages.

Method 200 includes an act of sending a heartbeat message to a container manager, the heartbeat message indicating a health status of busy (act 206). For example, upon receiving registration acknowledgement 126, health reporting agent 108 can initiate sending heartbeat messages to container manager 109 on each occurrence of a heartbeat. Health reporting agent 108 can wait for the next heartbeat and check the status of service 104. For example, health reporting agent 108 can determine that service 104 is active and busy. In response to the determination, health reporting agent 108 can send heartbeat 127 to container manager 109. Heartbeat 127 includes "status=busy", indicating that service 104 is active and busy (e.g., processing a message).

Method 200 includes an act of receiving the heartbeat message, the health status of busy representing that the service is performing work (act 207). For example, container manager 109 can receive heartbeat 127. The "status=busy" represents to container manager 109 that service 104 is performing work. Method 200 includes an act of indicating in durable storage that service is busy in response to receiving the heartbeat message (act 208). For example, container manager 109 can store busy 192 in health status store 111 to indicate that service 104 is busy. Thus, if heartbeat massages transition to status=idle or a number of heartbeat messages fail to be received, container manager 109 is aware of the status of service 104 prior to either of these occurrences.

Method 200 includes an act of acknowledging receipt of the heartbeat message to the health reporting agent subsequent to indicating in durable storage that the service is busy (act 209). For example, container manager 109 can send heartbeat acknowledgment 128 to health reporting agent 108 subsequent to storing busy 192 in health status store 111. Method 200 includes an act of receiving the acknowledgement receipt of the heartbeat message (act 210). For example, health reporting agent 108 can receive heartbeat acknowledgment 128 from container manager 109. Heartbeat acknowledgment 128 indicates to health reporting agent 108 that busy 192 was stored in health status store 111.

Method 200 includes an act of the message activated container operating in a manner that prevents the health reporting agent from sending a pre-configured number of further heartbeat messages to the container manager subsequent to sending the heartbeat message to the container manager (act 211). For example, application domain 102 can operate in a manner that prevents health reporting agent 108 from sending heartbeat messages to container manager 109 for a pre-configured number of heartbeats subsequent to sending heartbeat 127. Reasons for application domain 102 preventing heartbeat messages can include errors at service 104, application domain 102, or computer systems where service 104 and application domain 102 run.

Method 200 includes an act of detecting that a pre-configured number of further heartbeat messages for the service have been missed subsequent to receiving the heartbeat message (act 212). For example, container manager 109 can detect that it has missed a pre-determined number of heartbeat messages from health reporting agent 108 subsequent to receiving heartbeat 127. Method 200 includes an act of determining that a message activated container containing the service is no longer operating as intended in response to detecting that the container manager has missed a pre-configured number of further heartbeat messages from the health reporting agent subsequent to receiving the heartbeat message (act 213). For example, container manager 109 can determine that application domain 102 is no longer operating as intended. The determination can be made in response to missing the pre-determined number of heartbeat messages from health reporting agent 108 subsequent to receiving heartbeat 127.

Method 200 includes an act of re-starting the service in response to the determination (act 214). For example, container manager 109 can re-start service 104 in response to determining that application domain 102 is no longer operating as intended. Restarting the service includes an act of indicating in durable storage that the message activated service is to be re-started (act 215). For example, container manager 109 can store re-start 131 in health status store 111 to indicate that service 104 is to be re-started. Restarting the service includes an act of issuing a re-start command to a service control endpoint configured to re-start the message activated service (act 216). For example, container manager 109 can send re-start command 132 to service control end point 112.

Method 200 includes an act of receiving a re-start command from the container manager subsequent to health reporting agent being prevented from sending pre-configured number of further heartbeat messages to the container manager (act 217). For example, service control endpoint 112 can receive re-start command 132 from container manager 109 subsequent to health reporting agent 108 being preventing from sending the pre-configured number of further heartbeat messages to container manager 109.

Method 200 includes an act of re-starting the service in response to receiving the re-start command (act 218). For example, service control endpoint 112 can restart service 104 (and when necessary application domain 102) in response to receiving re-start command 132. Service control endpoint 112 can issue start command 133 to service 104 to re-start service 104. Start command 133 can be similar to start command 132. Service 104 can reinitialize and/or be brought back into memory in response to start command 133.

Method 200 includes an act checking for pending work for the service subsequent to re-starting the service (act 219). For example, during a re-start, service 104 can trigger OnStart handler 106. OnStart handler 106 can send pending work check 143 to service implementation 107 to check for pending work. In some embodiments, service 104 or application domain 102 checks external resources, such as, for example, a database, for pending work. If pending work exists, service 104 can process the pending work.

After a successful re-start, health reporting agent 108 (or another instance thereof) can again register service 104 for automatic re-starts and begin sending heartbeat messages container 109.

It may be that subsequent to sending heartbeat acknowledgement 128, container manager 109 receives heartbeat 141. Heartbeat 141 includes "status=idle", indicating that service 104 is inactive. Container manager 109 can store idle 193 in health status store 111 to indicate that service 104 is inactive. Container manager 109 can send heartbeat acknowledgment 142 to health reporting agent 108 subsequent to storing idle 193 in health status store 111. Health reporting agent 108 can receive heartbeat acknowledgment 142 from container manager 109. Heartbeat acknowledgment 142 indicates to health reporting agent 108 that idle 193 was stored in health status store 111. Thus, if heartbeat massages transition to status=busy or a number of heartbeat messages fail to be received, container manager 109 is aware of the status of service 104 prior to either of these occurrences.

Generally, the conditions on container manager 109 knowing that service 104 is busy are more strict and the conditions on container manager 109 knowing that service 104 is idle are less strict. That is, if service 104 is busy but container manager 109 detects service 104 as idle, there is some chance of container manager 109 failing to detect that service 104 is to be re-started when heartbeat messages stop being received. As such, service busy events can be immediate and synchronous On the other hand if service 104 is inactive but container manager 109 detects service 104 as busy, there is some chance of container manager 109 sending an unnecessary re-start command. However, service control endpoint 112 can simply ignore the command. Thus, service idle events can be asynchronous and non-immediate. However, it is also possible for service idle events to be immediate and/or synchronous.

In some embodiments, health reporting agent 108 immediately (and potentially out of sync with a current heartbeat time period) sends a status message indicating busy, when service 104 has new work to do. Service 104 then holds performance of the work until the status until container manager 109 acknowledges the messages. This increases the likelihood that container manager 109 is aware of the correct status of service 104 as busy prior to service 104 actually performing the work. Thus, if subsequent heartbeats fail to be received, container manager 109 can re-start service 104

Embodiments of the invention can also be used in a server farm environment. In these embodiments, container manager 109 can be implemented as a singleton or there can be container managers deployed at each of multiple different machines in the service farm. Thus, one container manager can control service restarts for a plurality of different services at a plurality of different servers. Alternately, each of a plurality of container mangers can control restarts for services at a corresponding machine.

In either embodiment, health reporting agents can include a service ID for a service when registering a service for automatic restarts. The service ID can be used to uniquely identify heartbeat messages for a specified service. The service ID can also be used as a callback to determine how to contact the corresponding service control endpoint for the application domain where the service is deployed. Container manager 109 can then re-start commands to the appropriate application domain to re-start a service.

In some embodiments, a container manager can also implement unregister functionality. Unregister functionality can be used by a health reporting agent to indicate when automated re-starts for a service are no longer desired. Unregister functionality may be used when an administrator expressly wants to stop a container and all the services inside a container, even though one or more service inside the container are busy. A health reporting agent inside a container may be aware of a reason why a container is being shut down and use unregister functionality to unregister services in the container.

Thus, embodiments of the invention can be used to re-start a service when it is determined that the service stopped during the processing pending work. A container manager durably tracks a service's status (busy/idle and alive/dead) and transitions between statuses. Accordingly, when a busy service is deemed dead (due to any event), the container manger can automatically re-start the service. Upon re-start the service can check for pending work and start executing its pending work.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including one or more processors and system memory, the computer system also including a container manager that is configured to listen for and store health events for message activated services, a method for re-starting a service contained in a message activated container, the method comprising:

an act of the container manager receiving a registration request from a health reporting agent that reports health events for the service, the registration request requesting to register the service for re-starts;

an act of the container manager indicating in durable storage that the service is registered for re-starts in response to receiving the registration request;

an act of the container manager acknowledging to the health reporting agent that the container manager has registered the service for re-starts subsequent to indicating in durable storage that the service is registered for re-starts;

an act of the container manager receiving a first heartbeat message from the health reporting agent, the first heartbeat message including an indication of a status of the service, the status selected from among idle or busy;

an act of the processor detecting that the container manager has missed a pre-configured number of heartbeat messages from the health reporting agent subsequent to receiving the first heartbeat message, and:

when the indication of the status of the service in the first heartbeat message comprises an idle status, an act of the container manager determining that the service went away due to inactivity; or when the indication of the status of the service in the first heartbeat message comprises a busy status:

an act of the container manager determining that the message activated container is no longer operating as intended in response to detecting that the container manager has missed a pre-configured number of heartbeat messages from the health reporting agent subsequent to receiving the first heartbeat message; and an act of the container manager issuing a re-start message in response to the determination, the restart message causing the service to restart and to check for pending work.

2. The method as recited in claim 1, wherein the registration request comprises a heartbeat message indicating a health status of busy, the health status of busy representing that the service is performing work, the method further comprising:

an act of the container manager indicating in durable storage that the service is active and busy in response to receiving the registration request.

3. The method as recited in claim 1, wherein the registration request comprises a service ID for the service, the service ID unique to the service such that messages related to the service can be distinguished from messages for other services.

4. The method as recited in claim 1, wherein the act of issuing a re-start message comprises an act of issuing a re-start message to a service control endpoint configured to re-start the service.

5. The method as recited in claim 4, further comprising an act of indicating in durable storage that the service is to be re-started in response to determining that the message activated container is no longer operating as intended.

6. The method as recited in claim 1, wherein further comprising:

an act of the container manager receiving a second heartbeat message from a second health reporting agent that reports health events for a second service, wherein the service and the second service are both services in a server farm;

an act of indicating in durable storage that second service is busy in response to receiving the second heartbeat message; and an act of acknowledging receipt of the second heartbeat message to the second health reporting agent subsequent to indicating in durable storage that the second service is busy.

7. The method as recited in claim 1, further comprising subsequent to restarting the service:

an act of receiving a request to again register the service for re-starts from the health reporting agent;

an act of again registering the service for re-starts by indicating in durable storage that the service is active and busy in response to receiving the registration request; and an act of acknowledging the registration for re-starts to the health reporting agent subsequent to indicating in durable storage that the service is active and busy.

8. At a computer system including one or more processors and system memory, the computer system also including a message activated container containing: a service, a health reporting agent, a re-start event handler, and a service control endpoint, the message activated container being configured to activate the service to perform work upon receiving a message for the service, the health reporting agent configured to monitor health state of the service, the service control endpoint configured to re-start the service upon receiving a re-start command, the service being configured to check for pending work upon re-starting of the service, a method for re-starting the service, the method comprising:

an act of the health reporting agent detecting that the service is active and busy;

an act of the health reporting agent sending a registration request to a container manager in response to detecting that the service is active and busy, the container manager being configured to listen for and store service health events for services, the registration request requesting to register the service for re-starts;

an act of the health reporting agent receiving an acknowledgement from the container manager, the acknowledgement acknowledging that the container manager has registered the service for re-starts;

an act of the health reporting agent determining whether the service is busy or idle and:

when the health reporting agent determines that the service is busy, an act of the health reporting agent sending a first heartbeat message, the first heartbeat message including an indication of a busy status of the service; or when the health reporting agent determines that the service is idle, an act of the health reporting agent sending a second heartbeat message, the second heartbeat message including an indication of an idle status of the service;

an act of the message activated container operating in a manner that prevents the health reporting agent from sending a pre-configured number of additional heartbeat messages to the container manager subsequent to sending the first heartbeat message or the second heartbeat message to the container manager; and when the health reporting agent sent the first heartbeat message including an indication of an busy status of the service, and subsequent to the message activated container operating in a manner that prevents the health reporting agent from sending a pre-configured number of additional heartbeat messages:

an act of the service control endpoint receiving a re-start command from the container manager subsequent to health reporting agent being prevented from sending pre-configured number of further heartbeat messages to the container manager;

an act of the processor and the service control endpoint interoperating to re-start the service in response to receiving the re-start command; and an act of checking for pending work for the service.

9. The method as recited in claim 8, wherein the registration request indicates that the service is active and busy.

10. The method as recited in claim 8, wherein the act of the health reporting agent sending a registration request to register the service for re-starts comprises an act of sending a service ID for the service, the service ID unique to the service such that messages related to the service can be distinguished from messages for other services.

11. The method as recited in claim 8, wherein the computer system includes a container activation service and further comprising prior to sending the registration request to register the service for re-starts:
   an act of the container activation service receiving a message for the service; and
   an act of activating the message activated container and the service in response to receiving the message by bringing the message activated container and the service into the system memory.

12. The method as recited in claim 8, further comprising subsequent to restarting the service:
   an act of the health reporting agent again sending a request to register the service for re-starts to the container manager, the registration request indicating that the service is active and busy;
   an act of again receiving a registration acknowledgement from the container manager, the registration acknowledgement acknowledging that the container manager has registered the service for re-starts.

13. The method as recited in claim 8, further comprising an act of the re-start event handler checking for pending work for the service comprises an act of checking a database for work that was started but not completed.

14. The method as recited in claim 8, further comprising an act of the re-start event handler checking for pending work for the service comprises an act of the re-start event handler detecting that work is pending, and further comprising:
   an act of the service completing the pending work.

15. The method as recited in claim 8, wherein the act of the health reporting agent detecting that the service is active and busy comprises an act of detecting that the service has received a message to process after a period of inactivity; and further comprising:
   an act of holding the message until the acknowledgement of the registration request is received; and
   an act of performing work based on the received message after the acknowledgement of the registration request is received.

16. A system for automatically re-starting services, the system comprising:
   a plurality of servers configured in a server farm, each server in the server farm comprising:
      one or more processors;
      system memory; and
      one or more computer storage media having stored thereon computer-executable instructions representing a message activated container, one or more services, a service control endpoint, a restart handler, and a health reporting agent;
   at least one container manager; and
   at least on durable health status store,
   wherein each health reporting agent is configured to:
      detect that a corresponding service is active and busy;
      send a registration request to one of the at least one container managers in response to detecting that the service is active and busy, the container manager configured to listen for and store service health events for services, the registration request requesting to register the service for re-starts;
      receive an acknowledgement from the container manager, the acknowledgement acknowledging that the container manager has registered the service for re-starts; and
      subsequent to sending the registration request, determine whether the service is busy or idle and:
         when the health reporting agent determines that the service is busy, an act of the health reporting agent sending a first heartbeat message, the first heartbeat message including an indication of a busy status of the service; or
         when the health reporting agent determines that the service is idle, an act of the health reporting agent sending a second heartbeat message, the second heartbeat message including an indication of an idle status of the service; and
   wherein each service control endpoint is configured to:
      receive a re-start command from the container manager subsequent to health reporting agent being prevented from sending pre-configured number of heartbeat messages to the container manager after sending a heartbeat message that indicates of a busy status of the service; and
      re-start the service in response to receiving the re-start command, including re-starting the restart handler, the service being configured to check for pending work for the service.

17. The system for automatically re-starting services as recited in claim 16, wherein the at least one container manager comprises a plurality of container managers.

18. The system for automatically re-starting services as recited in claim 17, wherein the plurality of container managers comprises at least one container manager at each of the plurality of servers in the server farm.

* * * * *